J. Draper.

Hoop Skirt.

No. 2046 Reissued Aug. 1, 1865.

Witnesses:
W. E. Smith
William Hodge

Inventor
J. Draper

UNITED STATES PATENT OFFICE.

JAMES DRAPER, OF POND EDDY, NEW YORK, ASSIGNOR, BY MESNE ASSIGNMENTS, TO SAMUEL H. DOUGHTY, OF CLINTON TOWNSHIP, ESSEX COUNTY, NEW JERSEY.

IMPROVEMENT IN SKELETON SKIRTS.

Specification forming part of Letters Patent No. 25,701, dated October 4, 1859; Reissue No. 870, dated December 27, 1859; Reissue No. 2,046, dated August 1, 1865.

*To all whom it may concern:*

Be it known that I, JAMES DRAPER, of Pond Eddy, Sullivan county, in the State of New York, have invented a new and useful Improvement in Skeleton Skirts; and I do hereby declare that the following is a full, clear, and exact description thereof, reference being had to the accompanying drawings, making part of this specification, in which—

Figure 1:
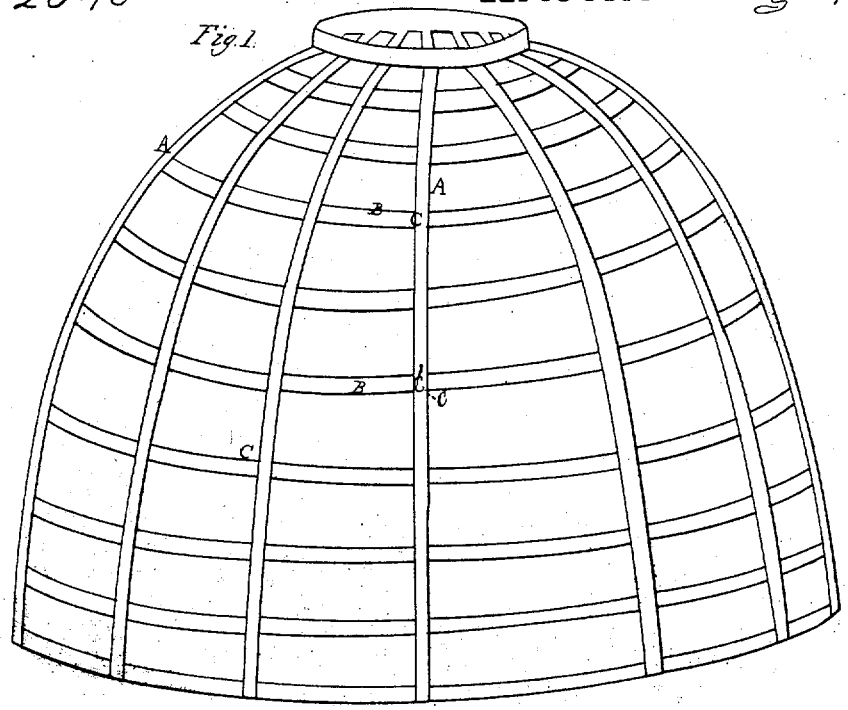
Figure 2:
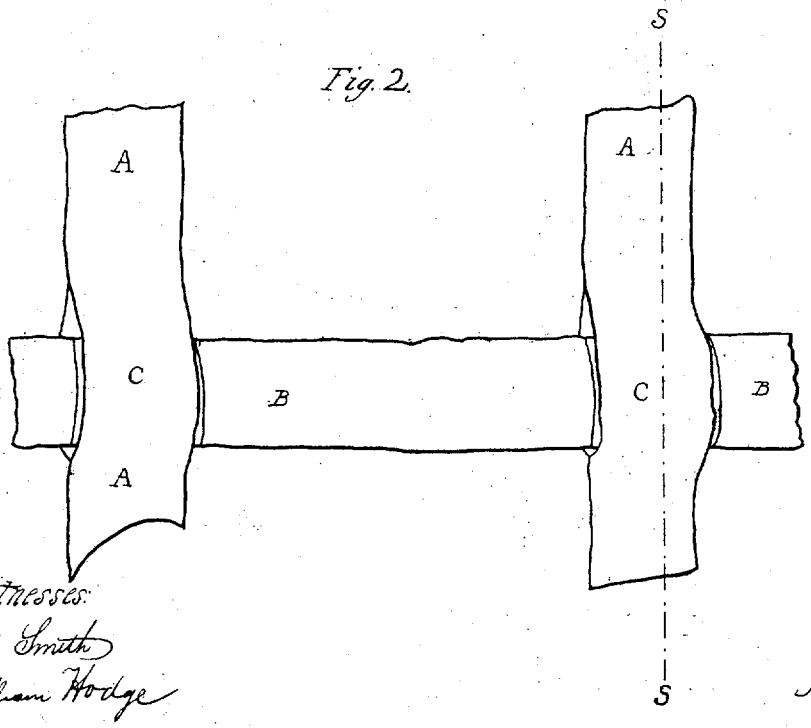
Figure 3:
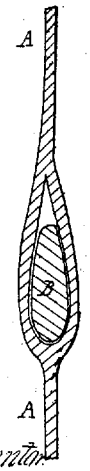

Figure 1 is an elevation of a skeleton skirt on my improved plan. Fig. 2 is a perspective view on an enlarged scale of a portion of the skirt; and Fig. 3, a cross-section on an enlarged scale, taken at the line S S of Fig. 2.

The same letters indicate like parts in all the figures.

Prior to my said invention various modes of making ladies' skirts were tried or suggested. Some of them were made of cloth extending all around and woven in alternate sections as a single cloth, and as a double cloth with a thick cord of Manila hemp introduced between the two thicknesses, so that when such cloth was fabricated into a skirt and extending all around, the series of Manila hemp cords should give more firmness to the skirt than if made of ordinary cloth. It was afterward suggested that strips of split bamboo or other like flexible substance might be substituted for the Manila cords. The strips when inserted were secured at their ends to the cloth, the whole width of the cloth between the two ends of the hoops being left free to slide on the hoops. Skirts so made soon went out of use, and what are known as "skeleton skirts" were then introduced and consisted of a series of tapes extending from the waist down, and a series of horizontal and parallel hoops, which were secured to the side of the tapes either by stitching, tying, or by rivet-clasps. To all this class of skirts there was a very serious objection. The fastening by which the hoops were secured to the side of the tapes was liable to break and permit the hoops to fall and drag on the ground. This was a source of inconvenience and often of serious accidents.

The object of my said invention, which is an improvement on skeleton skirts, was to remedy the defect experienced in the use of that class of skirt; and this object I attained by making the skirt of a series of tapes woven along their length alternately, as single and as double tapes, to form loops or openings at the required distances apart for the reception of the hoops, which are no longer dependent upon the means of fastening to the side of the tapes and cannot fall even if not fastened. A skeleton skirt when thus fabricated needs no fastening of the hoops to the tapes to hold them up, and the only fastening required is to prevent the tapes from sliding laterally on the hoops, so that if such fastening should give way the hoops will still be held up by the tapes.

In the accompanying drawings, A represents a series of tapes extending down from the waist, and B the hoops inserted in the loops C of the tapes, and which may be therein secured to prevent the tapes from sliding laterally on the hoops. I have found glue a suitable means for this purpose, as the weight of the hoops has no tendency to rupture the fastening, as in skeleton skirts known prior to my said invention. The hoops may be inserted in the act of weaving the tapes, or the tapes may be woven with the loops and the hoops inserted afterward. In the former of these two modes the loom should be made with the swords bent or curved outward to leave sufficient space between them for the passage of the longest hoops, and the warps should be mounted in the loom, so as to weave the whole series of tapes side by side; and the harness should be so mounted and operated, as is well known to weavers, that after weaving a given length, equal to the required distance between two hoops as single tapes, the harness, controlling one half of each set of warps, is suspended, and the other operated to weave the tapes with one half of the warps for a length a little more than the width of a hoop. That part of the harness is then suspended to weave another and equal length of tapes with the other half of the warps. A hoop is then inserted between the two series of tapes so woven, and the whole harness is then operated to weave the warps into single tapes, thus effectually inclosing the hoop in the loops thus formed. If desired, however, the hoops can be inserted in the loops of the tapes after they have been woven, as above described, in which case it will be well to form the loops a little larger to facilitate the insertion of the hoops.

What I claim as my invention, and desire to secure by Letters Patent, is—

The new manufacture of skeleton skirts substantially such as described, consisting of a series of tapes woven in the direction of their length, in alternate sections, as single and as double tapes, with the hoops inserted in the loops formed by weaving the tapes as double tapes, and there secured to prevent the tapes from sliding laterally on the hoops.

J. DRAPER.

Witnesses:
A. DE LACY,
WM. H. BISHOP.